`US005916926A`

United States Patent [19]
Cooper et al.

[11] Patent Number: 5,916,926
[45] Date of Patent: Jun. 29, 1999

[54] FOAMED HIGH DENSITY POLYETHYLENE

[75] Inventors: Kathleen K. Cooper, S. River; Vaseem Firdaus, Somerset, both of N.J.; Anthony Poloso, Yardley, Pa.; Paul Po-Luk Tong, Watchung, N.J.

[73] Assignee: Mobil Oil Corporation, Fairfax, Va.

[21] Appl. No.: 09/086,652

[22] Filed: May 29, 1998

Related U.S. Application Data

[62] Division of application No. 08/761,767, Dec. 5, 1996, abandoned.

[51] Int. Cl.$^6$ .................................... C08J 9/00; C08J 9/36
[52] U.S. Cl. .................................. 521/53; 521/96; 521/99; 521/149
[58] Field of Search ................................. 521/53–55, 96, 521/142, 149, 99

[56] References Cited

U.S. PATENT DOCUMENTS

| | | | |
|---|---|---|---|
| 3,936,565 | 2/1976 | Good | 428/315 |
| 4,206,166 | 6/1980 | Hayashi et al. | 264/126 |
| 4,510,031 | 4/1985 | Matsumura et al. | 204/159.2 |
| 5,574,074 | 11/1996 | Zushi et al. | 521/143 |

*Primary Examiner*—Blaine R. Copenheaver
*Attorney, Agent, or Firm*—Lori F. Cuomo; Dennis P. Santini

[57] ABSTRACT

Control of polyethylene melt strength and melt viscosity has been used to produce foamed articles.

6 Claims, No Drawings

FOAMED HIGH DENSITY POLYETHYLENE

This is a division of application Ser. No. 08/761,767, filed on Dec. 5, 1996 now abandoned.

FIELD OF THE INVENTION

The invention relates to foaming polyethylene with an initial density of at least 0.94 g/cc, to the foamed product and to articles of manufacture produced therefrom.

BACKGROUND OF THE INVENTION

Poor melt strength of high density (HDPE) polyethylene appears to be one factor which makes it difficult to produce foamed articles therefrom. In the past, polyethylene foams have been made from high pressure-low density polyethylene; the high pressure-low density polyethylene exhibits relatively superior melt strength compared to that of the HDPE, at the same viscosities. The melt strength of HDPE can be increased simply by increasing the HDPE molecular weight; however, the increase in molecular weight is accompanied by increase in melt viscosity which interferes with processability and foamability.

SUMMARY OF THE INVENTION

The invention provides an HDPE resin with high melt strength and low melt viscosity and is thus similar to high pressure low density polyethylene. The invention also provides foams of the HDPE and articles of manufacture produced therefrom.

DETAILED DESCRIPTION OF THE INVENTION

The foamed products produced from HDPE may be manufactured from HDPE with the following characteristics and properties.

The high density polyethylene can be characterized by MI (12, ASTM D 1238). The MI can range from, preferably, 0.5 to 200. Most preferably, the MI ranges from 1 to 4.

The high density products can be characterized by characteristics enumerated in the following table:

|  | Broad Range Range | Preferred Range | Most Preferred Range |
| --- | --- | --- | --- |
| Melt Index* | 0.5–200 | 0.6–10 | 1–4 |
| MFR** | 25–260 | 24–140 | 30–45 |
| Viscosity*** | 4–10 | 4–7 | 4.5–6.5 |
| Melt Tension**** | 5–20 | 5–10 | 5.5–6.5 |

*Melt Index is measured as $I_2$ in dg/min, ASTM 1238 [condition E at 190° C.]
**MFR Melt Flow Ratio is $I_{21}/I_2$, wherein $I_2$ is measured as above [*] and $I_{21}$ is measured according to ASTM 1238 condition F
***0.1 rad/sec frequency, 190° C. temperature, and expressed in units of $10^3$ Pascal-second or kPa-s. The SI unit is Pascal-second, abbreviated Pa-s. In the current context, viscosity is in units of 1000 Pa-s, or k Pa-s.
****Melt tension or melt strength is measured using a procedure outlined in Example 2 below, and expressed in units of gram-force.

The foregoing characteristics are found in polyethylene of density (ASTM D 792) of at least 0.939/cc g/cc, preferably at least 0.94 g/cc. The polyethylene can be the product of gas phase, slurry or solution polymerization. Polymerization can be conducted in the presence of metallocene, or metallocene based catalysts, as well as with chromium or Ziegler catalysts. The polyethylene can be a homopolymer of ethylene or modified to contain small amounts of comonomer selected from an alpha olefin containing 3 to 10 carbon atoms, preferably 4 to 10 carbon atoms; in these instances the polymer resin will contain greater than 90% of its weight as ethylene units.

For use in foaming operations the polyethylene must exhibit a melt strength of greater than 5 grams. Prior to treatment to achieve that melt strength, the virgin polyethylene exhibits a melt strength of 1 to 2 grams. For use in foaming operations the polyethylene must exhibit that melt strength of 5 to 20 grams and also exhibit a melt viscosity of 4 to 10 kPa-s. Prior to treatment to achieve that melt viscosity, the virgin polyethylene exhibits a melt viscosity of 2 to 3kPa-s. Preferably, the melt strength ranges from 5 to 10 grams. Most preferably, the melt strength ranges from 5.5 to 6.5. Preferably, the melt viscosity can range from 4 to 7. Most preferably, the melt viscosity ranges from 4.5 to 6.5. Typical HDPE, without the melt viscosity and melt strength values of the treated HDPE of the invention do not appear to produce feasible foams.

Accordingly, the polyethylene used in the foaming operation must be treated to exhibit both a melt strength of 5 to 20 and a melt viscosity of 4 to 10.

Viscosity at low shear rates was measured as dynamic viscosity at 190° C. using dynamic melt rheometers as outlined in ASTM D 4440-84. The test subjects the melt to oscillatory shearing over a range of frequency, and the complex viscosity at a low frequency of 0.1 rad/sec is used in this study. The sample is in the form of a disc, premolded using a temperature not exceeding 180° C. The test geometery consists of parallel plates, 25 mm in diameter. Strain magnitude used is preferably at 10% and should not exceed 50%. A nitrogen atmosphere is maintained during the test. Note that the complex viscosity thus measured is equivalent to steady shear viscosity (as measured in ASTM-D3835-90, for example), when compared at equal values of frequency and shear rate. See, for example, the textbook "Dynamics of Polymeric Liquids", by R. B. Bird, R. C. Armstrong and O. Hassager, (Wiley 1977) page 195."

In accordance with the invention, it has been discovered that the and melt viscosity can be achieved in a single operation. In accordance with the invention, the virgin untreated polyethylene can be subjected to peroxide modification at elevated temperatures, which are above ambient. The levels of peroxide range from 50 to 500 ppm while the temperature of the peroxide treatment will range from 150° to 260° C. The peroxides which can be used are high temperature peroxides that can undergo almost complete decomposition at normal compounding temperatures (200° to 260° C.). The half life temperature at 0.1 hours should be greater than 130° C. Half life temperature at a given time is the temperature at which one half of the peroxide has decomposed. Suitable but non-limiting examples of such peroxide are: dicumyl peroxide, 2,5-dimethyl-2,5-di-(tert buyl peroxy), hexane, tert-butyl cumyl peroxide, di-(2-tert-butylperoxyisopropyl)benzene, di-tert-butyl peroxide, 2,5-dimethyl-2,5-di-(tert-butylperoxy)hexyne- 3, cumene hydroperoxide these contain 2 to 20 carbon atoms. The peroxide may be preblended with the PE or introduced separately as a liquid feed using any of various methods known in the art.

Treatment of the polyethylene must be undertaken under nitrogen. Nitrogen will be introduced to the zone of polyethylene treatment in accordance with the invention at the feed throat of the compounding extruder so as to minimize exposure to oxygen. Compounding under this condition significantly enhances the crosslinking efficiency of the peroxide. The resultant peroxide treated polyethylene retains its thermoplastic properties. This property is valuable for recycling. Thus, the peroxide treatment of HDPE also comprises treating the HDPE with an antioxidant.

The HDPE is compounded with at least one, preferably two, antioxidants. The role of antioxidant stabilizers in polyethylene is to protect the polymer from oxidative degradation after compounding and thus preserve its strength properties. The mechanism for degradation of polyethylene via oxidation is an autocatalyzed, free radical chain process. During this process, hydroperoxides are formed which decompose into radicals and accelerate the degradation. Antioxidants prevent this degradation by (1) scavenging radicals to interrupt the oxidative chain reaction resulting from hydroperoxide decomposition and (2) consuming hydroperoxides.

The antioxidants contain one or more reactive hydrogen atoms which tie up free radicals, particularly peroxy radicals, forming a polymeric hydroperoxide group and relatively stable antioxidant species. The phenolic antioxidants are the largest selling antioxidant used in plastics today; they include simple phenols, bisphenols, thiobisphenols and polyphenols. Hindered phenols such as Ciba Geigy's Irganox 1076, 1010 and Ethyl 330 fulfill the first requirement and are considered primary antioxidants. Others include:

2,6-Bis(1-methylheptadecyl)-p-cresol butylated hydroxyanisold [BHA], [(CH$_3$ )$_3$CC$_6$H$_3$OH(OCH$_3$)]
Butylated hydroxytoluene [BHT], [DBPC], [Di-t-butyl-p-cresol]
Butylated octylated phenol
4,4'-Butylidenebis(6-t-butyl-m-cresol) [Santowhite powder]
2,6-Di-t-butyl methylamino-p-cresol
Hexamethylenebis(3,5-di-t-butyl hydroxy-cinnamate) [Irganox 259]
2,2'-Methylenebis(4-methyl-6-t-butyl phenol) [CAO 5], [Bis(2-Hydroxy-3-t-butyl-5-methyl phenyl)methane], [Cyanox 2246]
Octadecyl 3,5-di-t-butyl-4-hydroxyhydrocinnamate [Irganox 1076]
Tetrakis (methylene (3,5-di-t-butyl-4-hydroxyhydrocinnamate)methane [Irganox 1010]
4,4'-Thiobis (6-t-butyl-m-cresol) [Santonox]
Thiodiethylenebis(3,5-di-t-butyl-4-hydroxy) hydrocinnamate [Irganox 1035]
1,3,5-Tris(4-t-butyl-3-hydroxy-2,6-dimethylbenzyl)1,3,5-triazine-2,4,6-(1H, 3H, 5H) trione[Cyanox 1790]
Tris(2-methyl-4-hydroxy-5-t-butylphenyl)-butane [Topanol CA]

PROPRIETARY PHENOLICS

Antioxidant MBP-5P, 5T
Antioxidant SP
Antioxidant TBE-9
Antioxidant TBM-6P, 6T [Thiophenol]
CAO-42
Escoflex A-122, A-123
Hostanox 03
Isonox 129 [bisphenolic]
MO-14
Naugard 431 [hindered phenolic]
Naugard XL-1
Prodox 120
Prodox 147
Prodox 247
Prodox 340, 341, 343
Prodox B113
Prodox B121
Stabilite 49-467, 49-470
Uvi-Nox 1492
Vanox GT
Vanox SKT
Vanox 1290, 1320
Wingstay C
Wingstay L [polymeric hindered phenol]
Wingstay S [styrenated phenol]
Wingstay T
Wingstay V
Naugard P, PHR
Weston 399
Weston 626
Weston 430, 474, 491, 494, DHOP, PTP, PNPC, THOP
Tetrakis(2,4-di-t-butyl)phenyl-(1,1 -bi-phenyl)-4,4'-diylbisphosphite [Sandostab P-EPQ]
Triisodecyl phosphite [Weston TDP]
Triissooctyl phosphite [Weston TIOP]
TriLauryl phosphite [Weston TLP]
Trisnonylphenyl phosphite
Didecyl phosphite
Di Lauryl phosphite [(C$_{12}$H$_{29}$O )$_2$PHO]
Trisnonylphenyl phosphite/formaldehyde polymer [Wytox 438]
Wytox 320 (alkylaryl phosphite)

The major group of antioxidants constituting the second antioxidant include phosphorus-based antioxidants, generally phosphites. The phosphite acts by converting hydroperoxides to non-chain propagating alcohols, while the phosphite itself is oxidized to phosphates. These additives are chosen when processing stability is of concern. Trisnonylphenyl phosphite is the most widely used phosphite. Typical secondary antioxidants are GE's Weston TNPP, Ciba Geigy's Ultranox 626 and Irgafos 168. An exhaustive list of primary and secondary antioxidants can be founds in the reference [*Chemical Additives for the Plastics Industry*, Radian Corporation, Noyes Data Corporation, New Jersey, 1987]. Others include:

Tetrakis(2,4-di-t-butyl)phenyl-(1,1-bi-phenyl)-4,4'-diylbisphosphite [Sandostab P-EPQ];
Triisodecyl phosphite [Weston TDP];
Triisooctyl phosphite [Weston TIOP];
TriLauryl phosphite [Weston TLP];
Trisnonylphenyl phosphite;
Didecyl phosphite;
Di Lauryl phosphite [(C$_{12}$H$_{29}$O )$_2$ PHO];
Trisnonylphenyl phosphite/formaldehyde polymer [Wytox 438]; and
WytoX 320 (alkylryl phosphite).

In accordance with the invention, the mixture of the first antioxidant and second antioxidant in the HDPE may comprise up to 3000 ppm of the blend.

The treatment will be maintained for a time sufficient to attain the required melt viscosity and melt strength. Treatment of the polyethylene must be undertaken under nitrogen. Nitrogen will be introduced to the zone of polyethylene treatment in accordance with the invention at the feed throat of the compounding extruder so as to minimize exposure to oxygen. Compounding under this condition significantly enhances the crosslinking efficiency of the peroxide. A wide range of compounding equipment can be employed, and other inert gases could also be used to blanket the extruder's feedthroat. The melt viscosity values appear to be critical to foaming HDPE for the reason that low viscosity may allow for the initial growth of the nucleated bubbles without resistance during the foaming operation. The melt strength values may be essential to foaming HDPE as high melt strength may be needed when bubbles impinge on each other, and the flow in the melt membrane is extensional in nature.

Foaming can be undertaken in conventional equipment. The polyethylene with requisite melt strength and melt viscosity is admixed with a conventional blowing agent at temperatures ranging from 150° to 250° C. Blowing agents used in the examples include 2% Safoam FPE-50, a commercially available chemical blowing agent, and butane, a physical blowing agent. With butane the density reduction, as a result of foaming, is over 60%. Either open celled or closed cell cellular foams are contemplated; choice of blowing agent determines that cell structure. Other blowing agents include carbon dioxide, pentane, hexane, heptane, benzene, toluene, methyl chloride, trichloroethylene, dichloroethane, trichlorofluoromethane, dichlorodifluoromethane, trifluorochloromethane, 1,2,2-trichlorotrifluoroethane, and 1,2-dichlorotetrafluoroethane. The amount of blowing agent ranges from 0.1 to 5 moles/kg. The percent reduction in density relates to lightness in weight and is desirable for controlling material weight and costs.

Generally in accordance with the invention the density reduction, as a result of foaming, is at least 20%, generally over 30%, preferably over 40% and most preferably over 50%. The foams produced in the examples are closed cell structures. The resulting foamed polyethylene is characterized by flexural strength and flexural modulus is high.

The foamed high density products can be characterized by flexural strength and characterized by flexural modulus. These characteristics vary with degree of density reduction due to foaming. The higher stiffness of the foamed products can be an advantage for certain applications such as rigid packaging, recreational equipment, tubing and structural foam. These articles of manufacture will exhibit densities of 0.01 to 0.8 g/cc, preferably less than 8 g/cc. Production can be by extrusion processes as well as molding techniques. The foams can be used in electrical insulation, buoyancy aids, packaging, structural components, insulation, cushioning applications, toys, household articles and the like.

The following examples serve to illustrate embodiments falling herein.

EXAMPLE 1

An HDPE polyethylene resin has been prepared that possesses the proper balance of melt strength and melt viscosity, having a melt index (ASTM D 1238) of 2.0 dl/min and a density (ASTM D 792) of 0.952 g/cc. As shown in the following tabulation of melt strength and melt viscosity, the product has properties very close to those representative of HP-LDPE's and clearly distinct from the line representative of HDPE's.

|   |   | Viscosity (kPa's) | Melt Tension (g) |
|---|---|---|---|
| (a) | LDPE-1 | 2.7 | 3.7 |
| (b) | LDPE-2 | 4.0 | 6.3 |
| (c) | LDPE-3 | 7.1 | 16.2 |
| (d) | HDPE-1 | 2.1 | 1.3 |
| (e) | HDPE-2 | 14.8 | 4.6 |

-continued

|   |   | Viscosity (kPa's) | Melt Tension (g) |
|---|---|---|---|
| (f) | HDPE-3 | 47.1 | 9.0 |
| (g) | Modified HDPE-1 | 4.5 | 5.9 |
| (h) | Modified HDPE-2 | 6.5 | 6.1 |

From the table, it is clear that HDPE as a group has lower melt tension than LDPE as a group. For example, (e) has higher viscosity than the three LDPE's listed, but its melt tension lies at the low end of the LDPE melt tension values. In contrast, the modified HDPE shows a melt tension/viscosity relation closer to that for LDPE's. For example, (g) is quite similar to (b).

Melt strength evaluation is based on the measurement of melt tension, using a Goettfert Rheotens (made by Goeffert, Inc., Rock Hill, S.C.). The instrument has two counter-rotating toothed wheels which draw an extrudate filament at a controlled speed. The point of drawing pivots against a spring where a displacement transducer enables the measurement of the drawing force. The force needed to draw the strand at a given speed is the melt tension. The experiment consists of drawing the strand at a constant acceleration, so that a profile of melt tension versus drawing speed is obtained. The typical response is such that the force rises rapidly at first and then tend toward some asymptotic level, until the filament either breaks or shows draw resonance (i.e. oscillating force and filament cross-section). The speed chosen for this study is 10 cm/s, which is high enough to be in the relatively flat part of the curve, where the melt tension is somewhat insensitive to the precise drawing speed. Also, melt strength is sometimes defined as the melt tension at filament breakage. The melt tension we measure would not be much different from the melt strength thus defined, since the curve is relatively flat up to breakage.

The filament remains molten up to contact with the take-up wheels. The drawing takes place in an ambient air environment, but the filament remains molten up to contact with the take-up wheels. the draw distance, i.e., the distance between the die and the take-up wheels, is 9.5 cm. The extrudate filament comes from a capillary die 30 mm long and 3 mm in orifice diameter on a capillary rheometer (Goettfert Rheograph 2001), at a shear rate of 21 $s^{-1}$ and 190° C. The acceleration if 0.06 $cm/s^2$, which is sufficiently low that the data are not sensitive to its exact value. the conditions are close to those used by other investigators. Cf Ghijsels et al., *Intern Polymer Processing* V, p. 284 (1990). Some differences are source of extrudate, die shear rate, and draw distance. A general discussion of melt strength evaluation and the Rheotens equipment can be found in chapter 7 and 11, "Rheometers for Molten Plastics", by J. M. Dealy (Van Nostrand Reinhold 1982).

Foamability can be envisioned to be a balance between melt viscosity and melt strength. A comparison of melt tension plotted against viscosity at 0.1 $s^{-1}$ of a series LDPE's and HDPE's covering a range of melt index illustrate the trends. As expected, with a resin family, the two quantities are correlated with each other, but the correlation line differs for HDPE's and LDPE's . The HDPE's , having poor melt strength, have lower melt tension than LDPE's at the same viscosity level. This comparison thus depicts the relative difference between the two classes of polyethylene.

Moreover, the HDPE as a group follows the following relationship:

$$MT = 0.81 \times (viscosity)^{0.63}$$

and our modified HDPE can be further characterized by $$MT > 1.3 \times (viscosity)^{0.63}$$

EXAMPLE 2

The resin HDPE resin was extruded to foamed sheets on a commercial scale 3.5 inch Welex sheet extruder using 2% Safoam FPE-50 (a commercially available chemical blowing). We produced 70 mil sheets at approximately 300 lbs/hr with a premium LDPE and our novel HDPE resins. In this case, using the same level of CBA, we achieved a greater density reduction (more foaming) with the high density resin compared to the LDPE. Processing behavior was once again similar. Based on an examination of several micrographs, the cell structure of the LDPE and the HDPE foamed sheets was also similar.

Since the primary objective of the study was to develop a high stiffness foam resin with good foamability and processability, the foamed sheet was tested for flexural modules and strength (ASTM D 790-92). Results shown in Table 1 indicate that, although the density reduction with the HDPE resin is greater, the flexural strength and modulus is twice as high compared to that of the LDPE foam sheet. The higher stiffness could be an advantage for certain applications such as rigid packaging, recreational equipment, tubing, structural foam, etc.

TABLE 1

Physical Properties: Foam vs. Solid for LDPE and Modified HDPE

| Sample | CBA* (Safoam) level | Resin Melt Index dg/min | Resin Density g/cc | Density Reduction (%) | Flex Strength (1000 psi) | Flex Modulus (1000 psi) |
|---|---|---|---|---|---|---|
| LDPE solid | 0 | 2.2 | 0.918 | 0 | 1.5 | 30 |
| LDPE foam | 2 | 2.2 | 0.918 | 15 | 1.0 | 26 |
| HDPE solid | 0 | 2.1 | 0.953 | 0 | 4.8 | 134 |
| HDPE foam | 2 | 2.1 | 0.953 | 25 | 2.2 | 60 |

*CBA is commercial blowing agent

The peroxide modification method used to produce the product discussed in Example 2 is:

125 ppm Tigonox 101, added in the form of a 5% solution in mineral oil, to the mixer section of a Farrel continuous mixer, at a specific energy input of 0.11 hp-hr/lb, and output rate of 800 lb/hr.

In Example 2, a conventional HDPE (HMA-034) was run for comparative purposes and no acceptable foam product could be produced because of the premature collapse of the cell structure.

EXAMPLE 3

In a third example where a physical blowing agent, isobutane, was used, we were able to obtain density reduction of over 60%.

We claim:

1. A process for forming articles consisting essentially of foamed polyethylene from a polyethylene having an original density, prior to foaming, of at least 0.93 g/cc, comprising:
    treating said polyethylene with a peroxide and at least one antioxidant to provide an unfoamed polyethylene which has a melt strength of 5 to 20 grams and a melt viscosity of 4 to 10 (kPa-s) at 0.1 rad/s;
    admixing the unfoamed polyethylene with a blowing agent; and
    causing the polyethylene to foam and form a cell structure product which exhibits a density reduction, as a result of foaming of over 60%.

2. The process of claim 1, wherein the melt index of the polyethylene prior to being foamed ranges from 0.5 to 200 dg/min.

3. The process of claim 1, wherein the melt flow ratio ($I_{21}/I_2$ measured by ASTM D1238) of the polyethylene prior to being foamed ranges from 25 to 260 dg/min.

4. A process for forming articles consisting essentially of foamed polyethylene from a polyethylene having an original density, prior to foaming, of at least 0.93 g/cc, comprising:
    treating said polyethylene with a peroxide and at least one antioxidant to provide an unfoamed polyethylene which has a melt strength of 5 to 20 grams and a melt viscosity of 4 to 10 (kPa-s) at 0.1 rad/s;
    admixing the unfoamed polyethylene with a blowing agent; and
    causing the polyethylene to foam and form a cell structure product which exhibits a density reduction, as a result of foaming of over 20%.

5. The process of claim 4, wherein the melt index of the polyethylene prior to being foamed ranges from 0.5 to 200 dg/min.

6. The process of claim 4, wherein the melt flow ratio ($I_{21}/I_{21}$, measured by ASTM D1238) of the polyethylene prior to being foamed ranges from 25 to 260 dg/min.

* * * * *